INVENTOR.
ALOIS A. BUEHLER

INVENTOR.
ALOIS A. BUEHLER

INVENTOR.
ALOIS A. BUEHLER
BY
David W. Tibbetts
ATTORNEY

Aug. 2, 1966    A. A. BUEHLER    3,263,758
DRILL MOUNT CONNECTION
Filed Feb. 21, 1964    5 Sheets-Sheet 4

INVENTOR.
ALOIS A. BUEHLER
BY
David W. Tibbett
ATTORNEY

Aug. 2, 1966          A. A. BUEHLER          3,263,758
                    DRILL MOUNT CONNECTION

Filed Feb. 21, 1964                     5 Sheets-Sheet 5

INVENTOR.
ALOIS A. BUEHLER
BY
David W. Tibbitt
ATTORNEY

United States Patent Office 3,263,758
Patented August 2, 1966

1

3,263,758
DRILL MOUNT CONNECTION
Alois A. Buehler, Easton, Pa., assignor to Ingersoll-Rand Company, New York, N.Y., a corporation of New Jersey
Filed Feb. 21, 1964, Ser. No. 346,518
12 Claims. (Cl. 173—43)

This invention relates to rock drilling rigs and particularly to mounts for supporting rock drilling apparatus.

Heretofore, rock drills have been mounted on the ends of booms by a connection which allowed the drill to pivot about a horizontal axis. These connections have been of several types including: a pivoted joint which has to be manually unlocked and manually turned each time the drill is moved; a pivoted joint utilizing a hydraulic cylinder which is limited to swinging the drill through an arc of 90 degrees; a joint utilizing a gear drive for swinging the drill which inherently contains "play" because of the necessary gear clearance; and a joint which can swing the drill through an arc of 180 degrees, but needs two hydraulic cylinders to accomplish this.

The principal object of this invention is to provide a drill mount connection which substantially overcomes the disadvantages of previous drill mount connections.

Other important objects are: to provide a relatively inexpensive drill mount connection which can pivot through an arc of 180 degrees without requiring manual effort; to provide a drill mount connection which pivots 180 degrees while using a single hydraulic cylinder; to provide a power turning drill mount connection which eliminates undesirable play; and in general to provide a better drill mount connection than has been previously employed.

These objects are attained generally by interconnecting a drill member on a mount member by a crank which is pivoted to both members about separate offset and parallel axes, providing a power means on one member to rotate the crank through an angle of at least 90 degrees relative to that one member, and interconnecting both members together by a link which is pivoted to both and which forces the crank to rotate relative to the other member as it rotates relative to the one member. As the power member rotates the crank through an angle of 90 degrees or more, the two members rotate relative to each other through a much greater angle than the relative angular movement of the crank on the one member.

The invention is described in connection with the accompanying drawings wherein.

Figure 1:
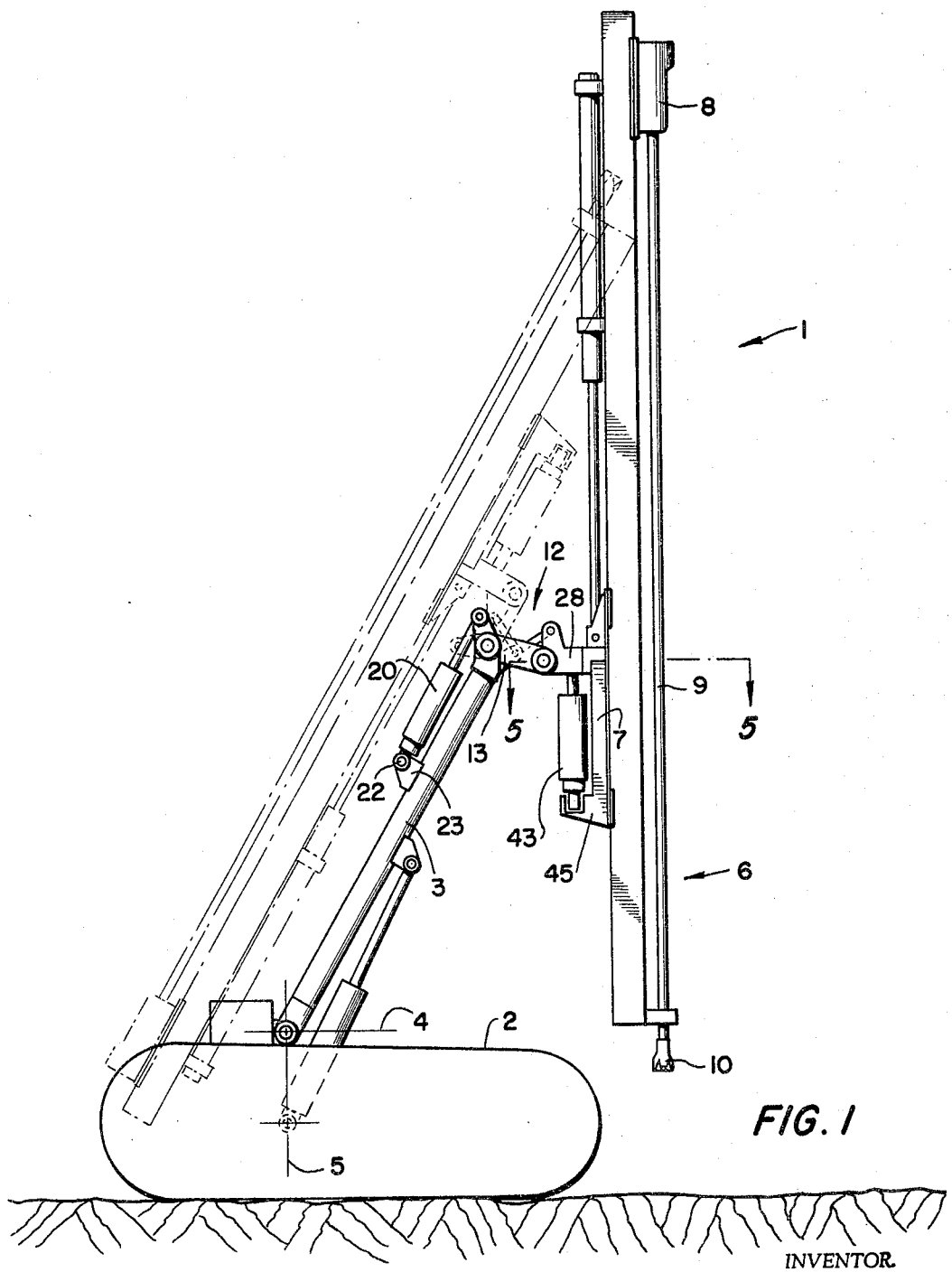
FIG. 1 is a somewhat schematic and elevational view of a tracked vehicle carrying a boom and a drill guide mounted on the boom by an embodiment of the invention and with the drill guide being shown in alternate positions in solid and dotted lines.
Figure 2:
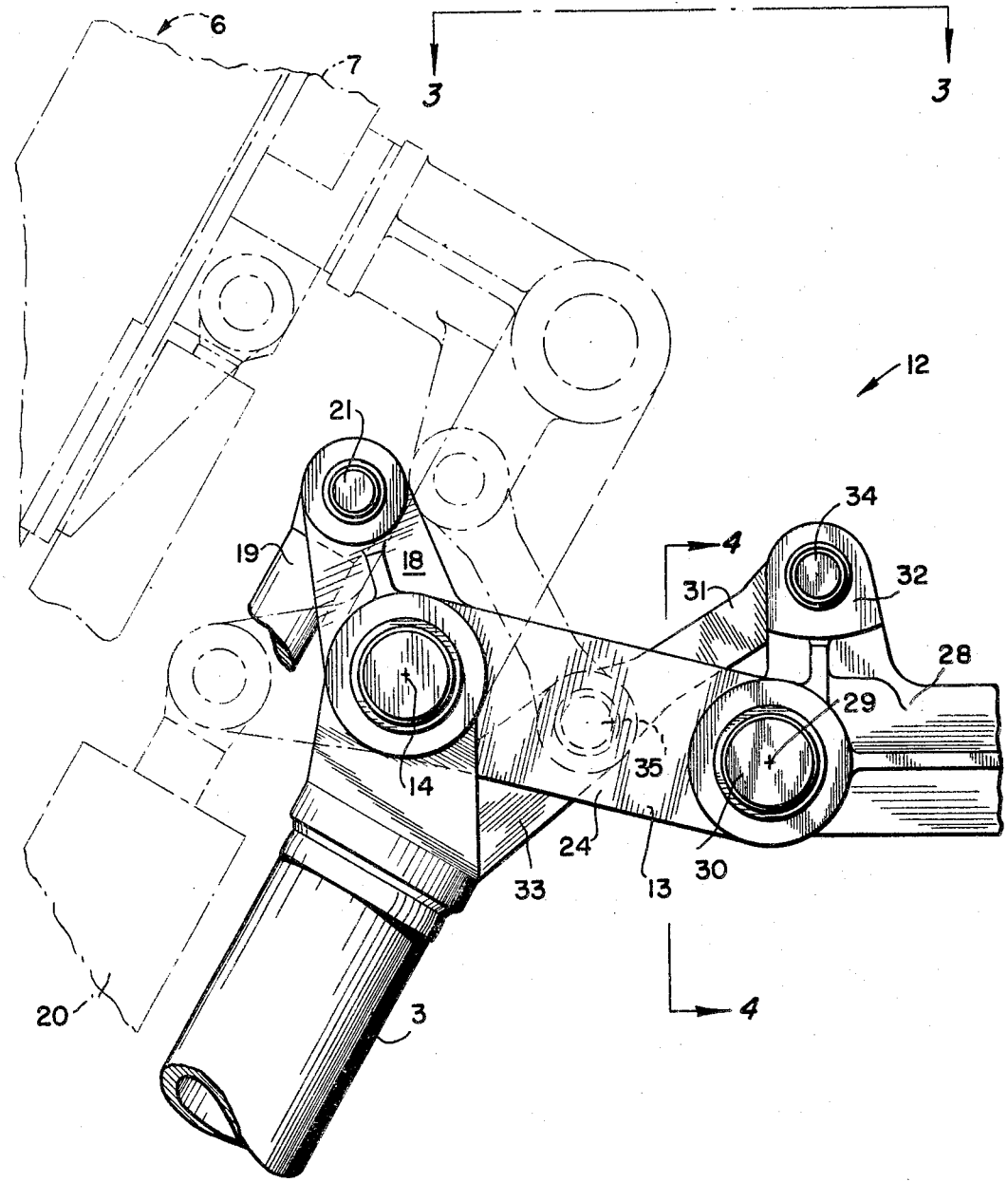
FIG. 2 is an enlarged fragmentary elevational view of the connection between the boom and drill guide with an alternate position being shown in dotted lines.

A rock drilling rig 1 is illustrated in FIG. 1 and includes a track-laying vehicle 2 which is known in the trade as a "crawler." The crawler 2 has a boom 3 which is pivoted to the crawler for movement up and down about a horizontal axis 4 and back and forth about a vertical axis 5. A conventional drill 6 is mounted at the outer end of the boom 3 and includes a drill guide 7, a drill motor 8, a drill rod 9, and a drill bit 10. The foregoing structure is conventional and forms no part of the present invention. The crawler 2 is shown merely to illustrate one form of the invention without intending to limit the invention to use on this type of drill rig since the invention is also useful on other types of drill rigs.

FIG. 1 illustrates the drill 6 in a solid-line position wherein it can drill vertical holes downward and in a dotted-line position with the drill bit 10 pointed angularly upward. In moving between these two positions, the drill 6 must rotate about the end of the boom through an angle of about 150 degrees. This rotation is accomplished by means of this invention which can stop and support the drill at any angle desired intermediate these two positions. The drill 6 will be rigidly supported without play in any position so that it can be operated at the desired angle without fear of damaging the drill mounting.

Although the drill 6 is shown in dotted lines in FIG. 1 extending at an acute angle to the vertical, the invention can move it through a greater angle to a position pointing directly upward if the drill 6 is offset so that it avoids the boom 3 as it moves to a vertical position.

This invention includes a unique drill mount connection 12 which connects and supports the drill 6 on the end of the boom 3. The drill mount connection 12 includes a bell crank 13 pivoted to the end of the boom 3 about a horizontal axis 14 lying intermediate the ends of the bell crank 13. The end of the boom 3 is bifurcated to provide a U-shaped end having a pair of spaced legs 16 which straddle the bell crank 13 with a pin 17 extending through the legs 16 and the bell crank 13 to provide the axis 14. The ends of the pin 17 are held in place by lock rings.

The bell crank 13 includes a short bifurcated arm 18 extending from the axis 14 and pivoted to the piston rod 19 of a hydraulic cylinder 20 by a pivot pin 21. The other end of the cylinder 20 is pivoted to the boom 3 about a pivot pin 22 located on a bracket 23. The outer end of the piston rod 19 sits between the bifurcations of the bell crank short arm 18 with the pivot pin 21 extending through the bifurcations and the piston rod 19.

The bell crank 13 has a long arm 24 which extends from the pin 17 at an angle of about 120 degrees relative to the short arm 18 and is widely bifurcated or U-shaped to form two spaced legs 25. An L-shaped crank 28 is pivoted between the legs 25 about a horizontal axis 29 provided by a pin 30 extending through the legs 25 and the L-shaped crank 28 intermediate its ends. As a result of this structure, the bell crank 13 can pivot on the axis 14 and swing the L-shaped crank 28 along an arcuate path while the L-shaped crank 28 can pivot about the axis 29 relative to the bell crank 13.

Figure 3:
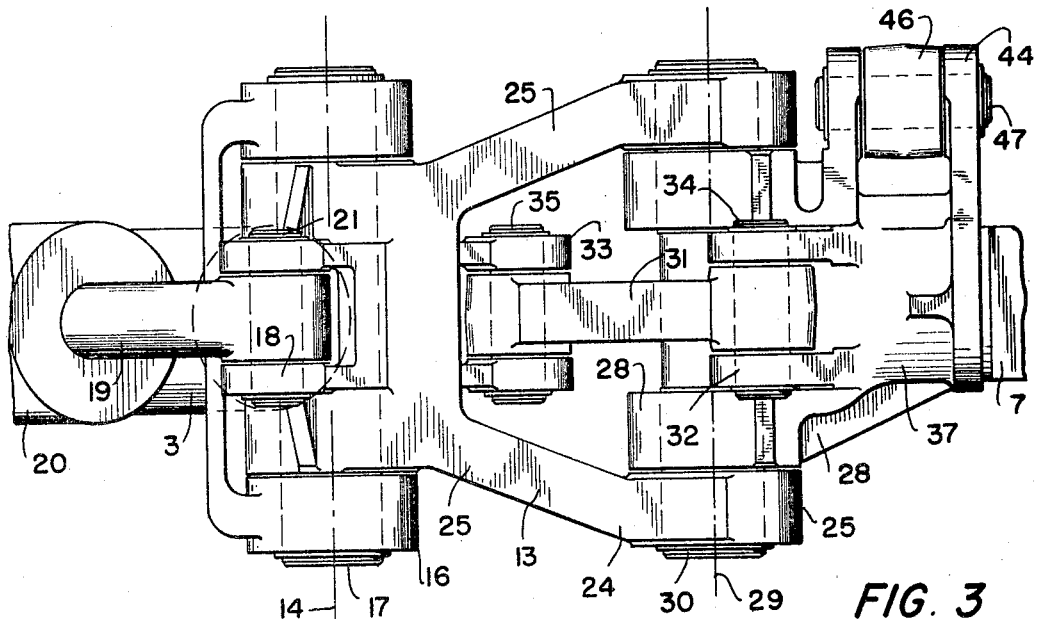
FIG. 3 is a top plan view of FIG. 2.

The L-shaped crank 28 is forced to rotate about the axis 29 in step with the rotation of the bell crank 13 by means of a link 31 interconnected between an arm 32 of the L-shaped crank 28 and a pair of lugs 33 on the boom 3. The arm 32 is split or bifurcated, as shown in FIG. 3, with the bifurcations straddling one end of the link 31 and a pivot pin 34 extending through the bifurcations and the link 31. At the other end of the link, the lugs 33 on the boom 3 are spaced on opposite sides of the link 31 with a pivot pin 35 extending through the lugs 33 and link 31 to provide a pivoted joint. The axes for the pins 34 and 35 are offset from the axes 14 and 29 a distance to cause the L-shaped crank 28 to rotate about the axis 29 through an angle of about 90 degrees when the bell crank 13 rotates about the axis 14 through an angle of 90 degrees. As a result, the rotation of the bell crank 13 through 90 degrees causes the L-shaped crank to rotate about 180 degrees about the end of the boom 3.

Figure 5:
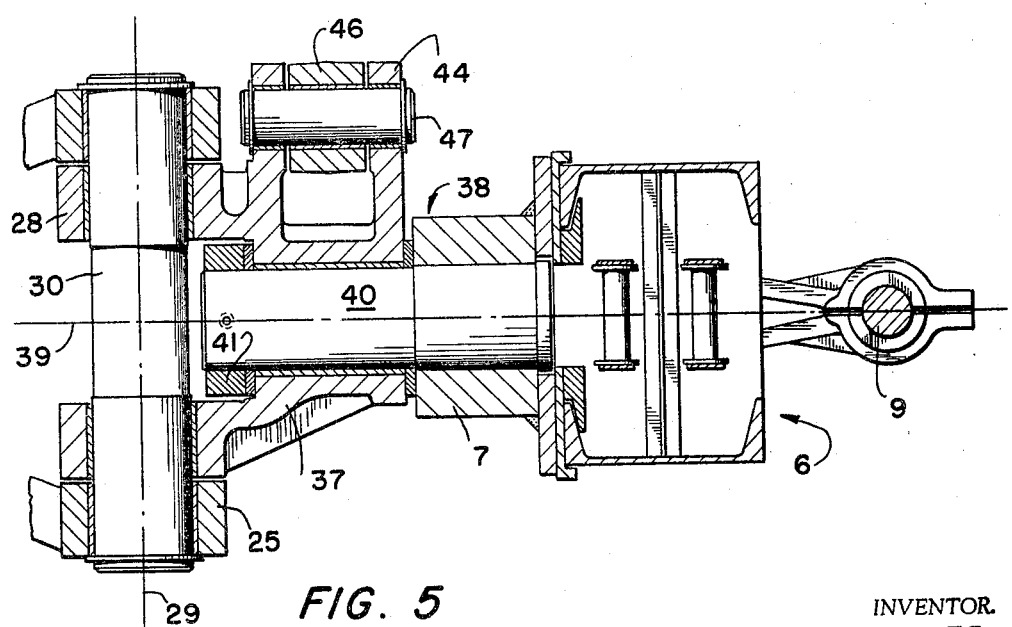
FIG. 5 is a section taken on line 5—5 of FIG. 1.
Figure 4:
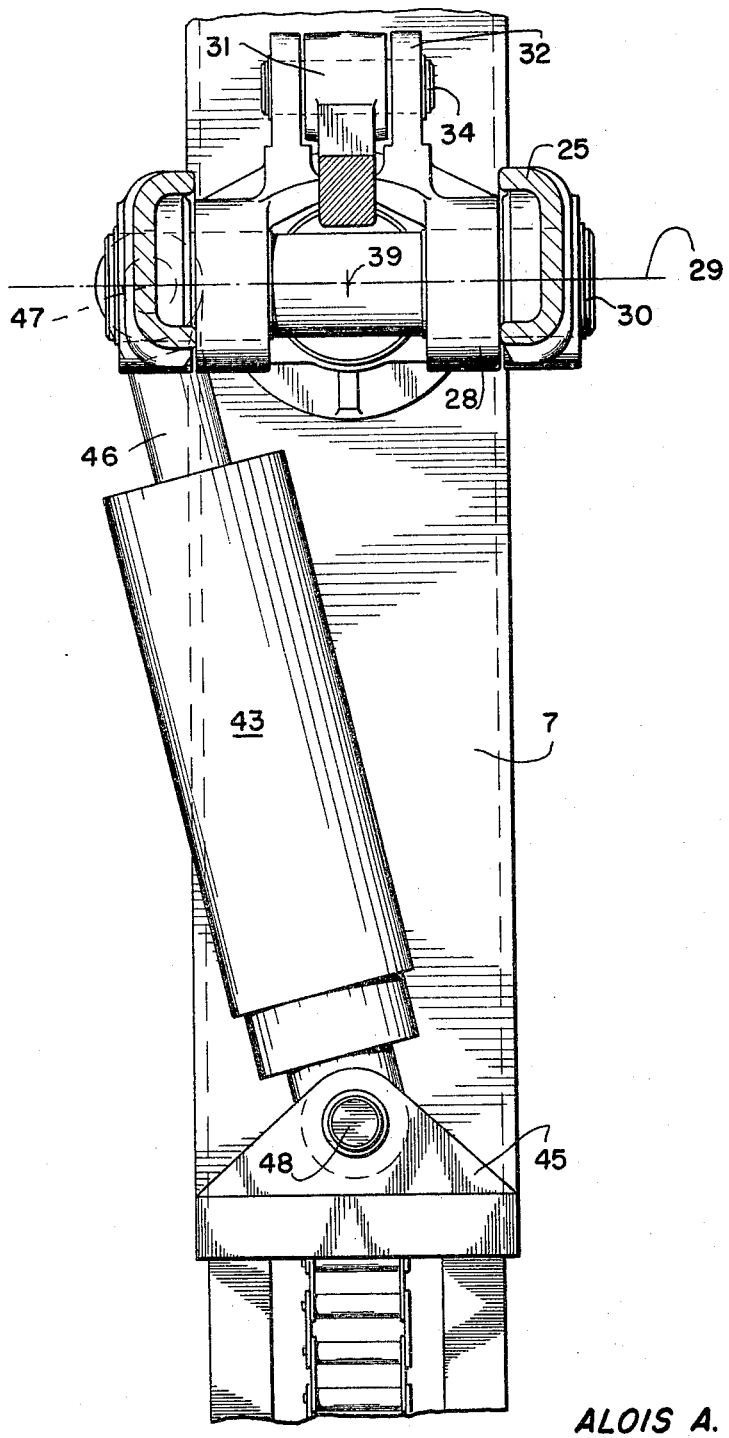
FIG. 4 is a sectional view taken on line 4—4 of FIG. 2.
Figure 6:
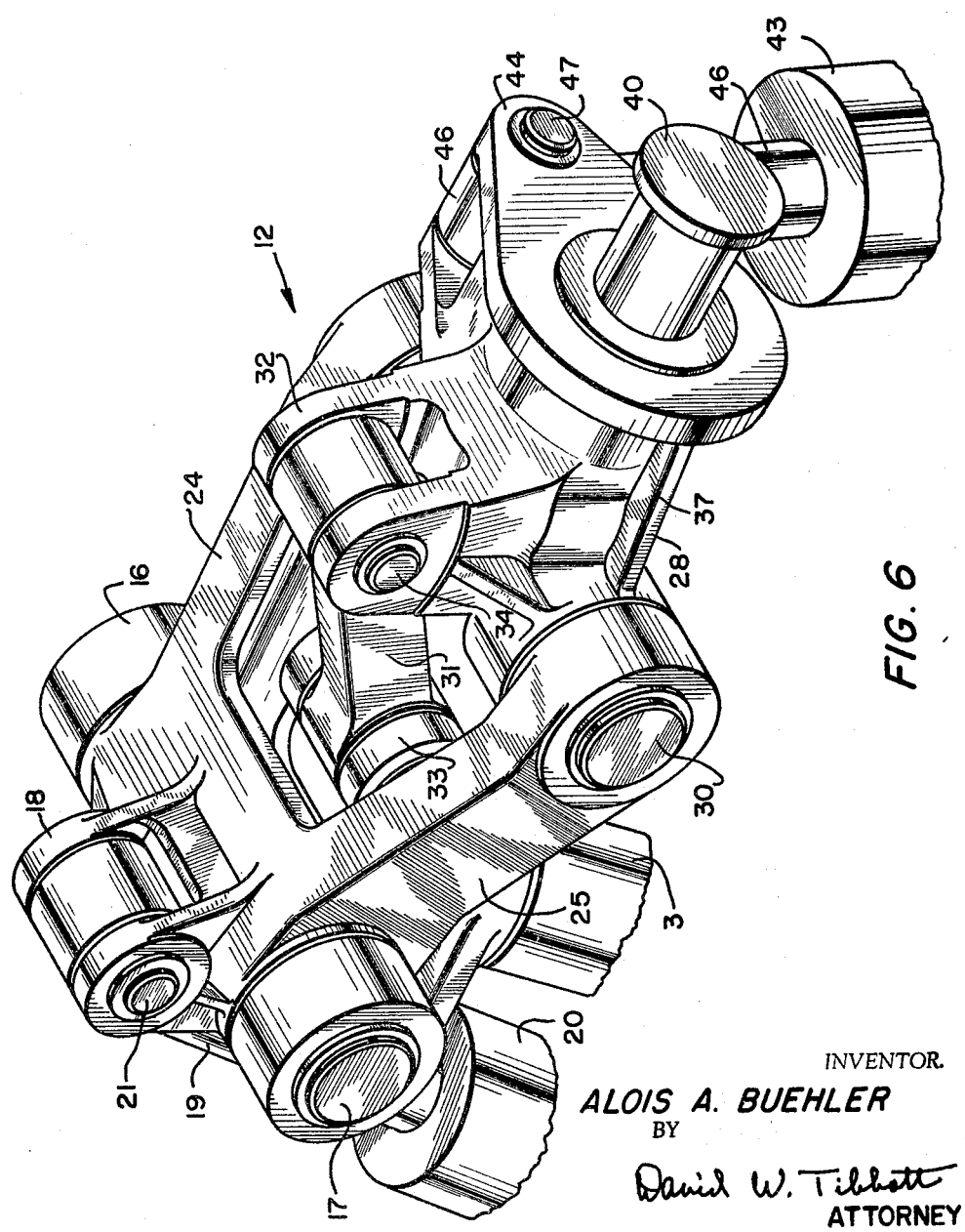
FIG. 6 is a fragmentary perspective view of the connection of FIG. 2 with the drill guide being omitted for purposes of clarity.

The other arm 37 of the L-shaped crank 28 carries the drill 6 and is connected to the drill guide 7 by a pivoted joint 38 having an axis 39 which runs at right angles to the axis 29 of the L-shaped crank 28. This axis 39 is termed the drill swing axis. Looking at FIG. 5, the arm 37 contains an axial bore and a shaft 40 is rotatively mounted in the bore and fixed to the drill guide 7. As the drill guide 7 rotates about the swing axis 39, the shaft 40 rotates in the arm 37. An enlarged washer 41 is fixed on the inner end of the shaft 40 to prevent it from sliding axially out of the arm 37.

Means is provided for power rotating the drill 6 about the swing axis 39. This means is a hydraulic cylinder 43 interconnected between a pair of spaced lugs 44 projecting from the crank arm 37 and the bracket 45 on the drill guide 7. The piston rod 46 of the cylinder 43 is pivoted to the spaced lugs 44 by a pivot pin 47 and the closed end of the cylinder 43 is pivoted to the bracket 45 by means of a pivot pin 48. Since the pivot pin 47 is offset from the swing axis 39 of the drill 6, the operation of the hydraulic cylinder 43 in either an extension or contraction direction forces the drill guide 7 to swing about the swing axis 39. Preferably, when the drill 6 is in the vertical solid line position shown in FIG. 1, the swing cylinder 43 is arranged to swing the drill guide 7 about the swing axis 39 through an angle extending at least 45 degrees to either side of a vertical plane.

Obviously, the dimensions of the embodiment shown in the drawing can be changed to vary the angular movement of the bell crank 13 necessary to produce a total angular movement of the drill 6 relative to the boom 3. This can be performed by changing the relative positions of the axes and the length of the lever arms.

Although a single embodiment of the invention is illustrated and described in detail, it will be understood that the invention is not limited simply to this embodiment but contemplates other embodiments and variations which utilize the concepts and teachings of this invention.

Having described my invention, I claim:

1. In a drill rig, the combination comprising:
   (a) a drill member;
   (b) a mount member;
   (c) a crank pivoted to said mount member about a first axis and pivoted to said drill member about a second axis spaced from the first axis;
   (d) power means connected between said crank and one of said members for rotating said crank through an arc of at least 90 degrees relative to said one member; and
   (e) a link connected between both members and pivoted to both for forcing said crank to rotate relative to the other member through a substantial arc as it rotates relative to said one member 90 degrees.
2. The combination of claim 1 wherein:
   (a) said first axis is located on said crank intermediate its ends and intermediate said second axis and the connection of said power means to said crank.
3. The combination of claim 1 wherein:
   (a) said first and second axes are parallel to each other and to the pivots of said link.
4. The combination of claim 3 wherein:
   (a) said first axis is located on said crank intermediate its ends and intermediate said second axis and the connection of said power means to said crank.
5. The combination of claim 4 wherein:
   (a) said power means is a single hydraulic cylinder.
6. The combination of claim 1 wherein said power means is a single hydraulic cylinder.
7. In a drill rig, the combination comprising:
   (a) a drill;
   (b) a drill mount;
   (c) a first crank pivoted on said drill mount about a first axis;
   (d) a second crank pivoted on said first crank about a second axis spaced from the first axis;
   (e) a drill mounted on said second crank;
   (f) power means connected between said first crank and said drill mount for rotating said first crank through an angle of at least 90 degrees; and
   (g) a link connected between and pivoted to both said second crank and said drill mount for pivoting said second crank about said second axis as said first crank pivots about said first axis.
8. The combination of claim 7 wherein:
   (a) the pivoted connection between said link and said second crank and said drill mount have axes which are parallel to and spaced from both said first and second axes.
9. The combination of claim 8 wherein:
   (a) said power means is hydraulic cylinder pivoted to both said drill mount and said first crank.
10. The combination of claim 9 wherein:
    (a) said drill is pivoted on said second crank about a third axis which extends at an angle to both said first and second axes.
11. The combination of claim 10 wherein:
    (a) said third axis extends at right angles to said first and second axes.
12. The combination of claim 11 including:
    (a) second power means for swinging said drill about said third axis independent of the movement of said first crank.

References Cited by the Examiner

UNITED STATES PATENTS

| 3,021,099 | 2/1962 | Samhammer et al. | 173—44 |
| 3,181,623 | 5/1965 | Lindgren | 173—43 |
| 3,209,842 | 10/1965 | Meyer | 173—43 |
| 3,218,893 | 11/1965 | Madison et al. | 173—43 |

MILTON KAUFMAN, *Primary Examiner.*

L. P. KESSLER, *Assistant Examiner.*